(12) United States Patent
Bobrov et al.

(10) Patent No.: US 6,619,553 B1
(45) Date of Patent: Sep. 16, 2003

(54) INTERACTIVE SMART CARD AND METHOD OF ITS FABRICATION

(75) Inventors: Yuri A. Bobrov, Moscow (RU); Pavel I. Lazarev, Belmont, CA (US)

(73) Assignee: Optiva, Inc., South Francisco, CA (US)

( * ) Notice: Subject to any disclaimer, the term of this patent is extended or adjusted under 35 U.S.C. 154(b) by 0 days.

(21) Appl. No.: 09/914,246

(22) PCT Filed: Feb. 9, 2000

(86) PCT No.: PCT/RU00/00045

§ 371 (c)(1),
(2), (4) Date: Aug. 24, 2001

(87) PCT Pub. No.: WO00/52638

PCT Pub. Date: Sep. 8, 2000

(30) Foreign Application Priority Data

Mar. 1, 1999 (RU) .............................. 99103911

(51) Int. Cl.[7] .............................. G06K 19/06
(52) U.S. Cl. .............................. 235/492; 235/380
(58) Field of Search .............................. 235/380, 492, 235/488, 490, 375, 486; 349/86, 158, 1, 96, 118, 122, 153; 361/737

(56) References Cited

U.S. PATENT DOCUMENTS

| | | | | |
|---|---|---|---|---|
| 3,751,137 A | * | 8/1973 | Fitzgibbons et al. | 349/153 |
| 4,797,542 A | * | 1/1989 | Hara | 525/338 |
| 4,876,441 A | * | 10/1989 | Hara et al. | 235/488 |
| 5,189,290 A | * | 2/1993 | Tsutsui | 235/454 |
| 5,870,163 A | * | 2/1999 | Watanabe et al. | 349/149 |
| 6,002,383 A | * | 12/1999 | Shimada | 235/492 |
| 6,050,494 A | * | 4/2000 | Song et al. | 235/492 |
| 6,293,470 B1 | | 9/2001 | Asplund | |

FOREIGN PATENT DOCUMENTS

| | | |
|---|---|---|
| EP | O498582 A2 | 8/1992 |
| GB | 2157463 A | 10/1985 |
| GB | 2275654 A | 9/1994 |
| JP | 08126014 | 12/1997 |
| RU | 2120651 C1 | 10/1997 |
| WO | PCT/US97/05423 | 10/1997 |

* cited by examiner

*Primary Examiner*—Karl D. Frech
*Assistant Examiner*—Edwyn Labaze
(74) *Attorney, Agent, or Firm*—Dorsey & Whitney LLP

(57) ABSTRACT

The present invention pertains to the field of electronic devices and essentially relates to smart cards (electronic cards) including a display that comprises a liquid-crystal indication element with an internal polarizer. This invention also relates to a method for manufacturing this card. The purpose of this invention is to simplify the structure of the electronic card, to provide a single process for manufacturing the card together with the display, to reduce the thickness of the card, to improve the mechanical strength, the manufacturability and the economical characteristics of said card and to increase its reliability.

32 Claims, 4 Drawing Sheets

INTERACTIVE SMART CARD AND METHOD OF ITS FABRICATION

BACKGROUND OF THE INVENTION

1. Related Applications

This application claims priority to Russian Application No. 99103911 filed Mar. 1, 1999 and PCT/RU00/00045 filed Feb. 9, 2000.

2. Field of the Invention

The invention is pertaining to technology of electronic devices that can be used as multifunctional electronic cards.

3. Description of the Related Art

There are electronic cards comprising functional elements placed between two plates. In particular, those cards include a microelectronic element which provides data storage and processing, a power supply element, a liquid crystal (LC) display, and a system for connecting with internal and external elements (EP 0498582, 1992; GB 2275654, 1994). Those elements are protected with two plates.

Several drawbacks are inherent in known electronic cards. In particular, some functional elements of the electronic card such as the microelectronic element and display are separate devices which are built during assembly of the card between the two plates. Such design requires use of a special connection between electronic elements and other elements of the card ensuring reliable electrical contact between them. Presence of several devices between two thin plates reduces mechanical durability of the design as a whole. Besides, the techniques of manufacturing liquid crystal displays used in the cards prevent manufacturing of elements of the card and display within a single technological process.

SUMMARY OF THE INVENTION

The technical results of the invention proposed herein are simplification of the electronic card design, opportunity to devise a single process of manufacturing of the card together with the display, reduction of the card thickness, increase of mechanical durability, productivity and feasibility of card manufacturing, as well as increase of reliability of the card.

The claimed technical result is achieved because, in a smart card (electronic card) containing two plates with the functional elements placed between and/or on them, the design of the card including a display with a liquid crystal display element, and possibly containing a microelectronic element, a power supply element, a keyboard, a system for communication with internal and external elements and/or other elements, the liquid crystal display element is the element containing two walls comprising appropriate electrodes or systems of electrodes formed on the internal surface sides of the walls; with at least one layer of polarizer and liquid crystal placed on top of the said electrodes or system of electrodes, while at least one of the said plates of the card serves as one of the walls of the display element, and the appropriate electrode or system of electrodes is formed on the internal surface of the said plate.

The second plate of the card may be used as the second wall of the display element, with appropriate electrode or system of electrodes formed on the internal surface side of the card.

A reflective-type element may be used as the display element, with the electrode or system of electrodes of at least one of the walls in the reflective-type display element made of optically transparent material, and a diffusely reflecting layer placed on the surface of the other wall. Then, the diffusely reflecting layer may also form the electrode or system of electrodes of the said other wall.

One of the walls of the element in the reflective-type display element may be made of optically transparent material, while the second wall, on which is a diffusely reflecting layer is designed, may be made of single-crystal silicon, or metal, or glass, or plastic.

A birefringent layer may be placed between the diffusely reflecting layer and the liquid crystal or between the liquid crystal and the polarizer layer in the reflective-type display element.

The system of electrodes may be made of electrically conductive polymer for at least one of the walls of the display element.

At least one of the polarizers may be implemented as a molecularly oriented layer of dichroic dye capable to forming a lyotropic liquid crystalline phase.

To display the output data in color, a layer of color matrix or pattern is formed on the internal-surface side of one of the walls of the display element between the wall and one of the polarizers.

At least one of the polarizers may be manufactured from polarizing elements differing in color and/or in the polarization axis direction.

At least one of the polarizers may be placed on an optically transparent electrode, or between the wall and the electrode, or on the insulating sublayer covering the optically transparent electrode, or between the alignment layer located on the polarizer and the electrode, or between the alignment layer and the insulating sublayer covering the electrode Due to the claimed set of attributes, the display used in the card can have the optical path not exceeding 10 microns.

At least one auxiliary plate with windows to position the appropriate functional elements may be placed between the external plates of the card, this auxiliary plate being a delimiter.

The liquid crystal display may be implemented such as to include a touch screen and a digital and/or alphanumeric tablet for data input.

The technical result of the method of manufacturing the electronic card consists in the opportunity to provide a single process of card manufacturing combined with display manufacturing, increase of productivity and feasibility.

The specified technical result of the claimed method is achieved because, in the method of manufacturing a smart card (electronic card) providing positioning of functional elements on at least one of the two plates of the smart card and joining the plates, a display based on a liquid-crystal display element with an internal polarizer is used as one of the functional elements of the card, the display element being formed during card manufacturing, with at least one of the plates of the card used as one of walls of the display element, and the appropriate electrode or system of electrodes of the display element formed on the internal-surface side of the latter plate of the card.

The second plate of the card may be used as the second wall of the display element, with the appropriate electrode or system of electrodes of the display element formed on the internal-surface side of the second plate of the card.

For the reflective-type display element, the electrode or system of electrodes of at least one of the walls is made of optically transparent material, on top of which a polarizer layer is formed, and a diffusely-reflecting layer is formed on the surface of the other wall, with at least the part of the card plate which is the wall of the display element made of optically transparent material.

The diffusely reflecting layer may form the electrode or system of electrodes of the said wall.

A birefringent layer is formed on the surface of the diffusely reflecting layer from one side, or on the surface of the polarizer layer from the other side.

At least one polarizer layer is formed on an optically transparent electrode, or on the wall of the display element, or on the insulating sublayer covering the optically transparent electrode.

The procedure of forming the system of conductors ensuring switching of the functional elements on at least one of the card plates is performed before or after formation of the electrode or system of electrodes of the display on that plate, or simultaneously, in a single work cycle. The electrodes and conductors can be made of the same material, or of different materials.

When the functional elements are deposited, at least one intermediate plate is imposed on at least one of the card plates, the intermediate plate having windows to place the appropriate functional elements, and the functional elements are placed on the plate before imposing the intermediate plate, or after, in the appropriate windows, or partially before and partially after.

The liquid crystal layer of the display element is formed on the polarizer surface of one of the card plates before joining the card plates, or after joining the card plates, by flood-filling.

A transmissive-type element can be used as the display element, with system of electrodes of both walls of that element made of optically transparent material.

BRIEF DESCRIPTION OF THE DRAWINGS

Design of the electronic card is illustrated in FIGS. 1–6.

DETAILED DESCRIPTION (THE PREFERRED EMBODIMENTS)

Figure 1:
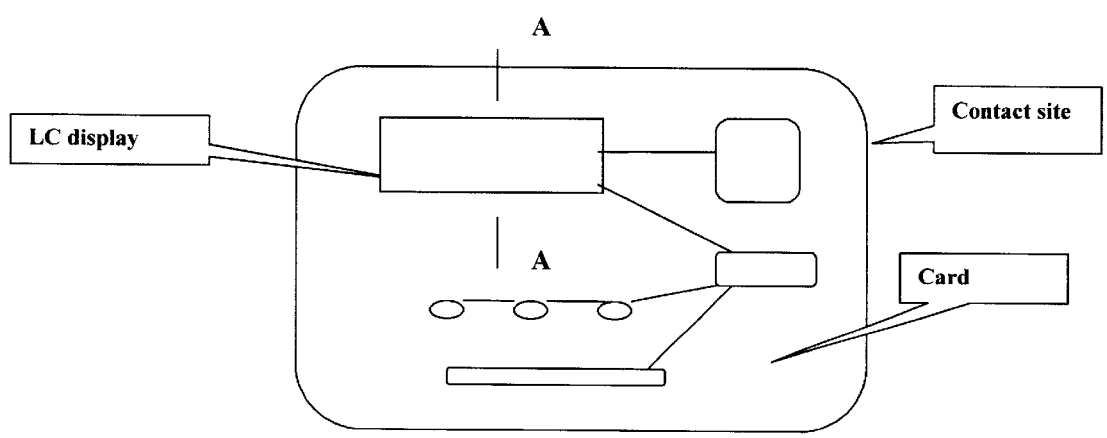
FIG. 1 illustrates the overall schematic of arrangement and interaction of elements of the electronic card.

The electronic card (FIG. 1) may contain a microelectronic element 11, a power supply element 12, a keyboard system 13, a communication device 14 for the electronic card to connect to the external devices of data input/output, a display 16, a system of conductors, and/or other elements (not shown). The microelectronic element allows processing the data transferred from the external reading/writing device or from the keyboard system, storing the data, and controlling the display. That element may be implemented as one or several microelectronic circuits (microchips) built into the card. Alternatively, it may be built by manufacturing of the microelectronic circuit directly on the internal surface of the plate by, for example, depositing a silicon film on the plate and subsequent formation of the desired electronic elements on the film. The power supply provides operation of all elements of the card. A solar battery, an electrochemical power supply or any other accessible power supply can serve as the power supply. The keyboard system allows the user to change mode of operation of the card and/or to enter the necessary data. The keyboard system can be realized on the basis of capacitance, inductive, or optical junction, as well as being based on change in conductivity or other properties of the appropriate material as mechanical, sonic, or other action is applied. The unit for external-device communication for read/write operations on the card is necessary for exchange of data stored in he card memory and the remote device of data processing. This can be implemented using either the contact or non-contact method, utilizing the capacitance, inductive, optical, magnetic, radio-frequency, or other junction. The display is necessary to visualize the mode of operations of the card, the data stored in the card, and the process of data exchange with the external device. The displays used may be liquid crystal displays of various types, including displays based on twist nematics, supertwist nematics, smectic liquid crystals, etc. The system of conductors ensures switching between internal elements of the card. This system can be implemented based on any of the known conducting materials including metals and conducting polymers. The simplified presentation of the electronic card in FIG. 1 is caused by pointing out the performance of the particular part of the element, namely of the liquid crystal display. The claimed design of the card with the appropriate display allows to implement the claimed advantage for various sets of functional elements of the multi-purpose card.

Figure 2:
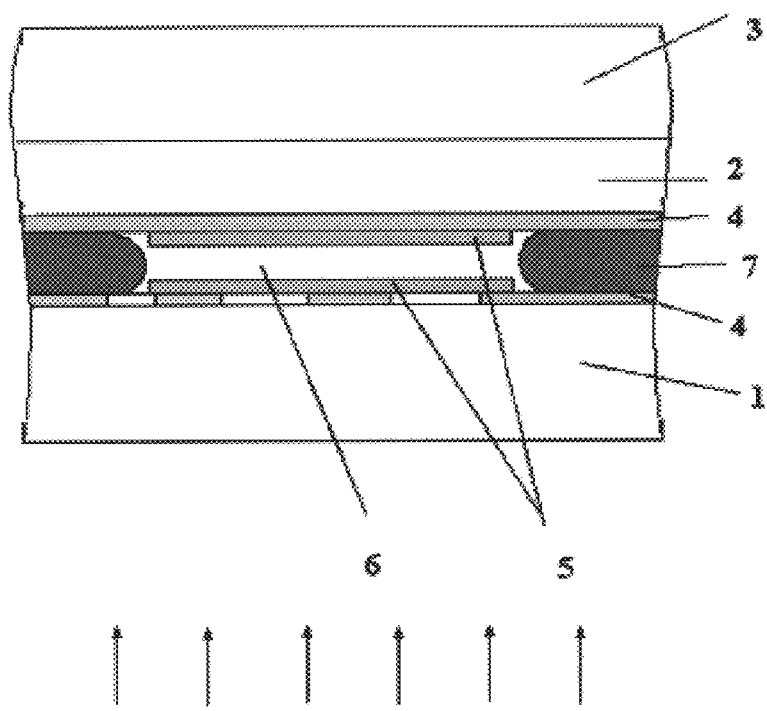
FIG. 2 illustrates the design of the electronic card in the A—A section with liquid crystal transmissive-type display, in which one of the card plates serves as the liquid crystal display wall.

Consider in more detail the layout of the display of the electronic card. In one of the preferred embodiments of the electronic card with the transmissive-type liquid crystal display, one of its walls is also the plate of the electronic card (plate 1) which is made of optically transparent material, at least in that region of the card. (FIG. 2). The other wall of the display 2 is not a plate of the card, and can be made of any transparent material, for example, polymer film or glass. On the internal-surface side of the wall surface 2 and plate 1, electrodes or systems of electrodes 4 are formed which are made of optically transparent materials, for example, ITO or conducting polymer. On the facing surfaces of the electrodes 4, polarizer layers 5 are deposited, with their polarization axes oriented at some specific angle with respect to each other, for example, 90°. The region between the polarizers is filled with liquid crystals 6, which are aligned by the polarizer surfaces thus forming the twist-structure twisted at some specific angle, for example, 90°. Outside the working region of the display, the wall 2 and the plate 1 are hermetically attached to each other using one of the known techniques, for example, by glue layer 7. The other method of attachment may be welding of the plate and the wall materials. From the side of the wall 2, the whole structure of the electronic card is closed by the second plate 3. A glue layer provides durability of attachment of the plate 3 with the wall 2 of the display and other elements of the structure. The liquid crystal layer can be applied before the plates are joined or after the plates are joined by flood-filling.

Figure 3:
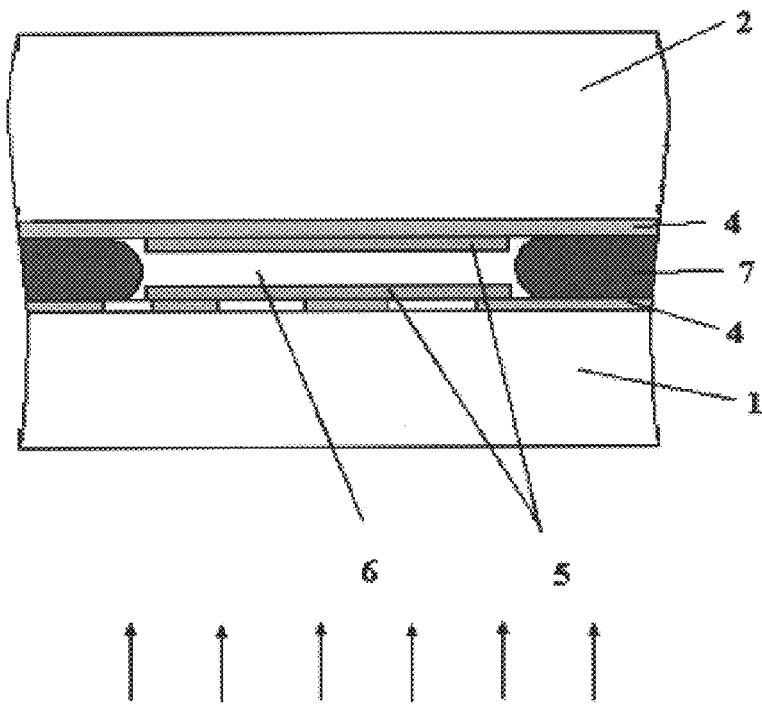
FIG. 3 illustrates the design of the electronic card in the A—A section for the card with transmissive-type display, in which both plates of the card serve as walls the liquid crystal display.

In another embodiment of the transmissive display (FIG. 3), the plates 1 and 2 of the electronic card are also the walls of the display. The system of electrodes 4 and the polarizers 5 are positioned on the plates.

Figure 4:
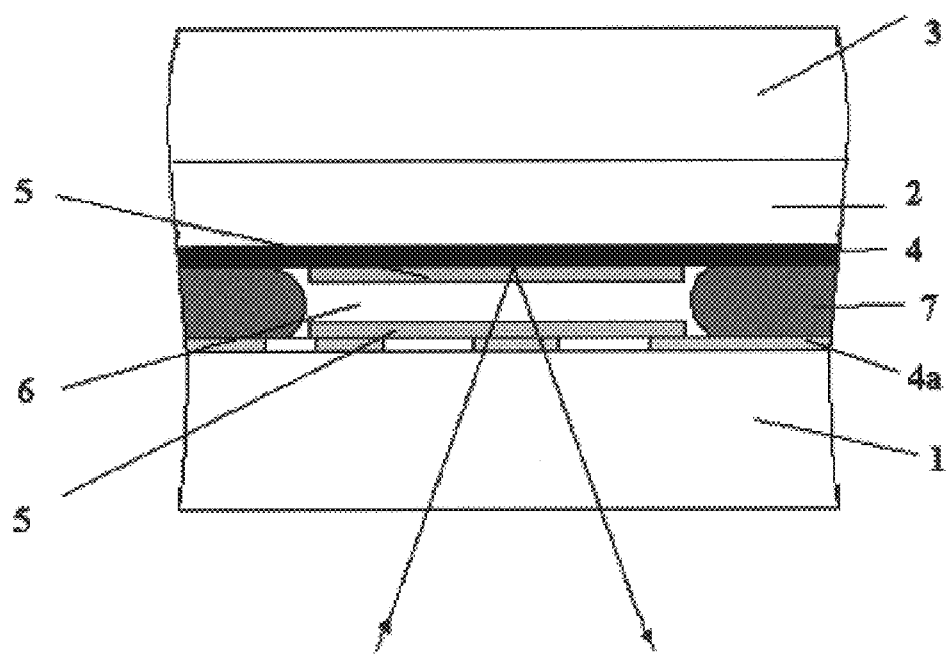
FIG. 4 illustrates the design of the electronic card with a reflective-type display in the A—A section.

In the electronic card embodiment with a reflective-type display (FIG. 4), a diffuse reflector 9 is formed on one the display walls instead of the systems of electrodes 4. The reflector is made of aluminum film and also serves as the electrode or the system of electrodes. Then the display wall 2 on which the reflector is placed may be made of opaque material, for example, crystalline silicon. It is evident that an embodiment of the electronic card design is possible in which the reflective element is placed in the plate 1, and also when two plates of the card serve as display walls.

Figure 5:
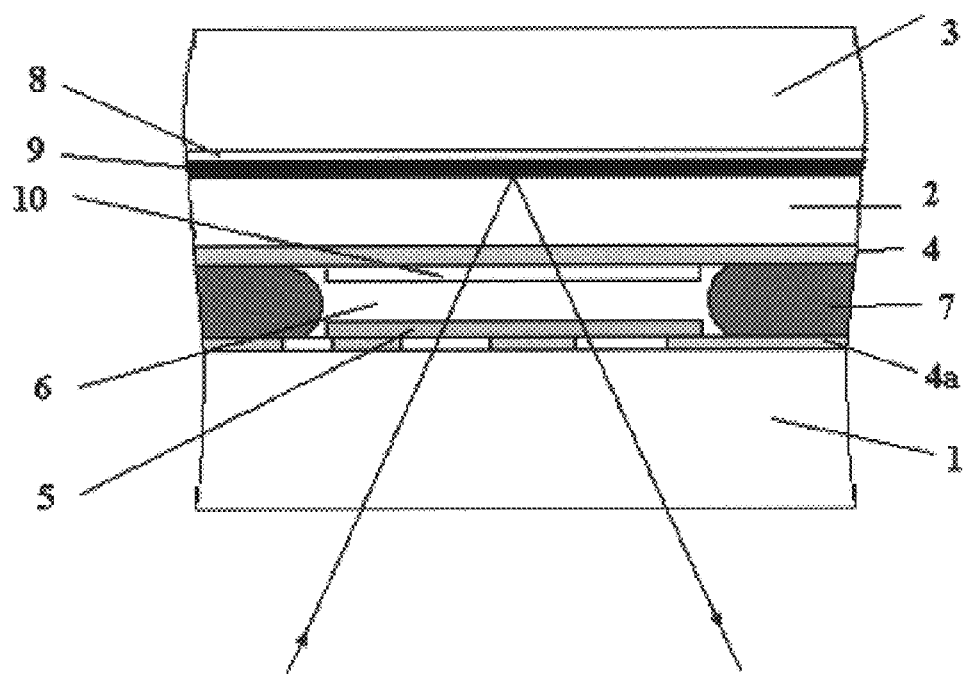
FIG. 5 illustrates the design of the electronic card with a reflective-type display in the A—A section for the case of the single polarizer.

A reflective display with a single polarizer may be implemented as the electronic card. One of electronic card embodiments with a single polarizer is shown in FIG. 5. In this case, structure of the display wall 1 which is the card plate remains the same. The second wall 2 is a quarter-wave plate, and may be made of optically anisotropic material of suitable thickness. The fast optical axis of the wall is oriented so as to be at 45° angle to the direction of the liquid crystal orientation. On the surface of that wall which is external with respect to the liquid crystal, a diffuse reflector 9 is formed. On the internal side, a transparent electrode or system of electrodes 4 is formed. On top of electrodes, an alignment layer 10 is deposited, which renders alignment to the liquid crystal 6. The plate 3 covers the entire structure as in other cases, and is fixed with a glue layer 8. The liquid crystal 6 is oriented by the polarizer surface 5 and the alignment layer 10 forming the twist structure as in other cases.

The embodiments of manufacturing of the electronic card with a liquid crystal display considered herein in which the optical path could be less than 10 microns ensure reduction of the card thickness.

When the card is manufactured, at the same time the conductor system is formed on the card plates. Simultaneously with forming the conductor system, a system of electrodes of the display is formed on one of the card plates. For the transmissive embodiment of the display, ITO can, for example, be used as the conducting material. When the electrodes and the conductor system are formed in the single technological process, the process efficiency increases as well as the reliability of conducting system of the card.

The other embodiment of card manufacturing is a method in which the conductor system of the card and the electrodes are formed in separate technological processes. Then, the materials of the electro-conductive elements may be different from each other.

After forming the electrodes, polarizers are formed using one of the known methods.

Figure 6:
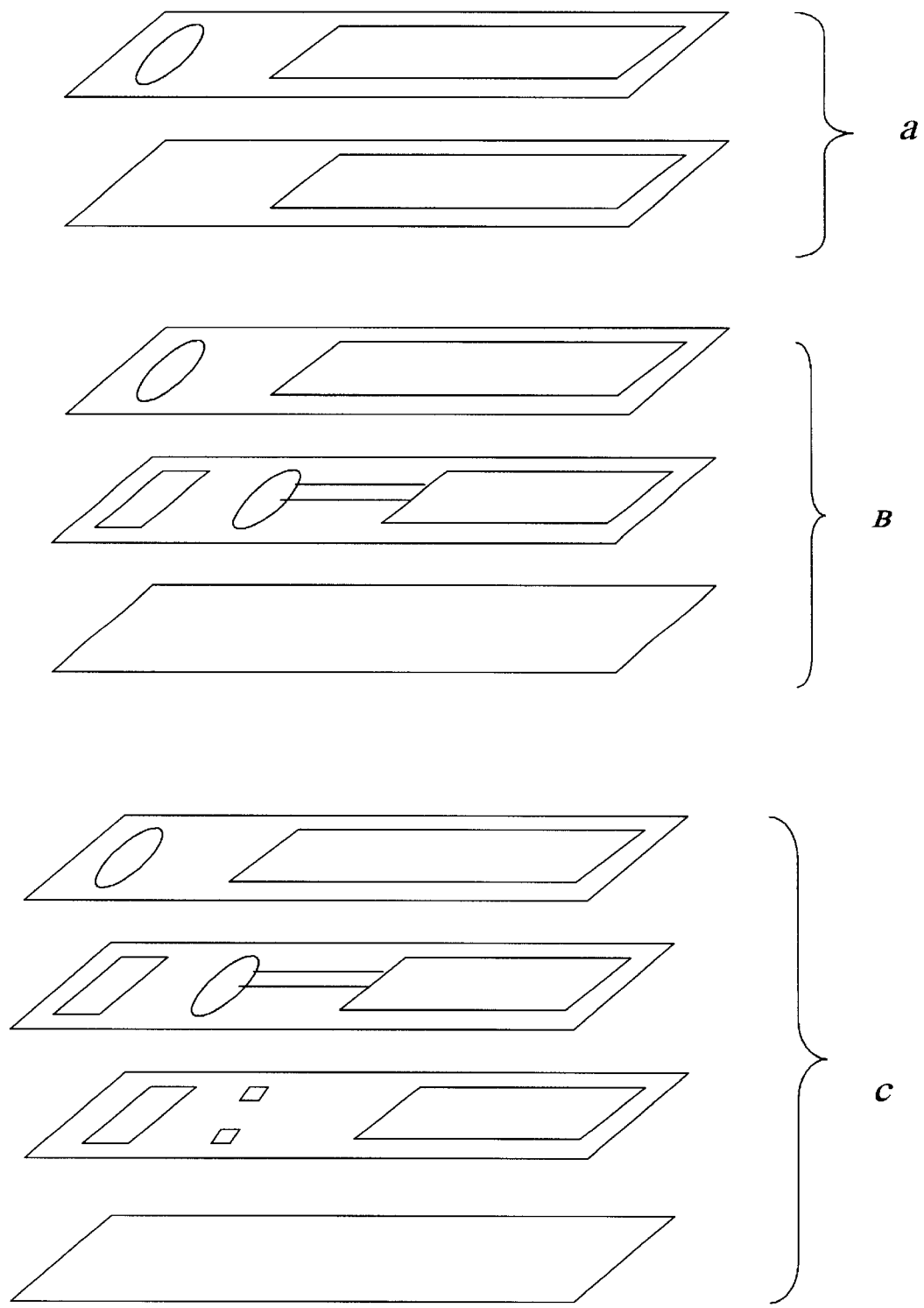
FIG. 6 illustrates a schematic for different embodiments of the electronic card assembly for the card with intermediate plates.

One of the final operations when the electronic card is manufactured is superimposition and joining of the card plates. When the electronic card is assembled, conformal superimposition of the covering plate may result in shift, skew, and displacement of the elements of the card because the functional elements differ in dimensions (thickness). This may eventually damage integrity of the card and decrease reliability of its operation. Therefore, lamination of the card which usually finishes the card manufacturing presents quite high requirements. The other embodiment of the electronic card assembly is positioning its elements in windows specially created in the intermediate thin plate. This plate then serves as the delimiting element. Use of this auxiliary delimiting plate allows to perform the final operation of joining the card plates along the planar surface of the auxiliary plate. If necessary, two or more thin auxiliary plates may be used which are superimposed one on top of the other and joined one with the other. Accordingly, the window for placing the element largest in thickness or for the element requiring through optical or electric contact must be present in all auxiliary plates. If functional elements placed on both of the external plates of the card are present, windows are created in the corresponding auxiliary plates. In FIG. 6, a schematic is shown for different embodiments of the electronic card assembly. The following options are available: a) without an auxiliary plate, b) with one auxiliary plate, and c) with two auxiliary plates.

The presented embodiments of electronic card implementation and method of its manufacturing do not exhaust all embodiments described in the Claims.

The electronic card operates in the following manner. From the keyboard, the functional status of the card is set determined of the function required at the given moment. For example, the card may be tuned to operate as an ID card, a credit card, a medical card, a parking card, etc. The number of functions possible to be performed is determined by the micro-electronic circuit used in the card. After the functional status is set by the keyboard, the operation mode is set determining the type of actions to be performed on the card. This may be viewing the data present in the card memory by the user, or data exchange with an external device as some operation serviced by the card is performed. For example, the user can set the mode of viewing the balance of the bank account, perform fixed-amount payments, etc. In other case, for example, payment in a shop, the operation mode is set for data exchange, and the card is inserted in the read/write device. Data exchange is performed via the communication device or interface. Then, the card display may visualize the data related to the performed operation. As the specified actions are performed, the microchip processes commands entered by the user or the operator servicing the card via a communication device. The card stores data in its memory and controls data output on the display. The power-supply element provides power for all functional elements of the card.

The operation principle of the liquid-crystal display with polarizing elements placed inside the cell will be considered using a transmissive-type liquid crystal display based on 90° twisted nematic (FIG. 2). The non-polarized light beam falls onto the display from the side of the first plate 1. After passing that plate and the transparent electrode 4, the light becomes polarized upon passing the polarizer 5. If voltage is absent on the electrodes, the polarized light passes the liquid crystal layer 6 rotating the polarization plane by 90°, and then passes, without attenuation, through the second polarizing layer 5, the transparent electrode 4, and the plates 2 and 3. The regions of the electrodes will then look bright. When voltage is supplied onto the electrodes, the twisted form of the nematic is transformed into the homeotropic form in which the polarization axis is oriented perpendicularly to the plane of the plates 1 and 2. Then, the nematic no longer rotates the polarization plane of the passing light. This means that the direction of the light polarization plane set by the polarizer 5 will not change upon passing the nematic layer, and will be, after passing the nematic 3, perpendicular to the direction of the second polarizer 5. When light passes through the second polarizer 5, it is absorbed, and this region will look dark in the passing light. In the regions of the display where electrodes are absent, the twisted form of the nematic will remain, and those regions will always look dark.

In the reflective-type displays, the operation principle remains the same as in the transmissive-type display. The difference is in that the light does not pass through the plate 2, but passes through all the remaining elements twice. Then, orientation of the polarization plane of the light remains the same upon reflecting from the reflective layer 9.

In a single-polarizer display, light passes the plate 1, the electrode 4, the polarizer 5, the liquid crystal 6, the alignment layer 10, and the electrode 4. Then it reaches the quarter-wave plate 2. After passing it twice with reflection from the layer 9, polarization plane of the light rotates by 90°, and the light returns without hindrance through all the layers. When voltage is applied, the liquid crystal no longer rotates the light polarization plane. Therefore, the light falls on the quarter-wave plate with the same direction of the polarization plane as it was when it left the polarizer 4. After passing the quarter-wave plate twice, the plane rotates by 90°, so the light becomes absorbed by the polarizer upon reaching it. Then, the regions where the electrodes are will look bright where no voltage is applied, and dark where there is voltage applied.

In the process of the manufacturing, the thickness of the liquid crystal display element should be made minimal. The dimensions of the assembled smart-card should not exceed the standards for the industry. At the same time the optical thickness (optical path of the light beam) should be enough for the light conversion, i.e. for the forming of the image. The optical thickness of the functional elements of the display element (not including the walls of the card) should not exceed 10 microns. The optical thickness of the polarizer produced on the basis of the molecularly oriented dyes is in the range of 0.1 to 1 micron. Generally an optical thickness of 2 to 6 microns can achieve the desired light conversion. (D. Demus, J. Goodby etc. Handbook of Liquid Crystals, Vol. 2B, New York 1998). This fact makes the disclosed properties quite practical.

Thus, the claimed electronic card provides the entire range of the necessary functions. The claimed technical result was achieved, which was simplification of the card design and provision of opportunity to manufacture several elements in a single technological process leading to increased manufacturing efficiency. The card thickness is also reduced, and mechanical durability increased since the card plate becomes a display element thus eliminating at least one gluing operation. The manufacturing feasibility is also improved because display wall material is saved. The eventual increase of operation reliability of the card increases because the process of its manufacturing becomes unified.

What is claimed is:

1. A smart card comprising two plates with functional elements placed between them, said functional elements including a liquid crystal display element, wherein the liquid crystal display element includes:
   two spaced walls and liquid crystal placed between them, wherein each wall includes a system of electrodes formed on the internal surfaces of the walls, and
   at least one polarizer;
   wherein the at least one polarizer is internal, and
   at least one of said walls of the display element is one of the plates of the card.

2. The smart card as in claim 1, wherein the second plate of the card is used as the second wall of the display element.

3. The smart card as in claim 2, wherein the liquid crystal display element has the optical path not exceeding 10 microns.

4. The smart card as in claim 1 or 2, wherein a reflective element is used as the display element, the system of electrodes of at least one of the walls in the reflective element is made of optically transparent material, and a reflecting layer is placed on the surface of the other wall.

5. The smart card as in claim 4, wherein the reflecting layer forms the system of electrodes of said other wall.

6. The smart card as in claim 4, wherein one of the walls of the reflective display element is made of optically transparent material, while the second wall, on which a reflecting layer is placed, is made of single-crystal silicon, or metal, or glass, or plastic.

7. The smart card as in claim 4, wherein a birefringent layer is placed between the reflecting layer and the liquid crystal in the reflective display element.

8. The smart card as in claim 1 or 2, wherein the system of electrodes on at least one of the walls of the display element is made of an electrically conductive polymer.

9. The smart card as in claim 1, wherein at least one of the polarizers is implemented as a molecularly oriented layer of dichroic dye capable to form a lyotropic liquid crystalline phase.

10. The smart card as in claim 1, wherein a layer of color matrix or pattern is formed on the internal-surface side of one of the walls of the display element between the wall and one of the polarizers.

11. The smart card as in claim 1, wherein at least one of the polarizers is manufactured from polarizing elements differing in color and/or in the polarization axis direction.

12. The smart card as in claim 1 or 2 wherein at least one auxiliary plate with windows to position the appropriate functional elements is placed between the plates of the card.

13. The smart card as in claim 1 or 2 wherein the liquid crystal display is implemented such as to include a touch screen and an alphanumeric tablet for data input.

14. The smart card as in claim 1 wherein at least one polarizer is placed on the top of the system of electrodes.

15. The smart card as in claim 1 wherein at least one internal polarizer is placed between the system of electrodes and the wall of the display element.

16. A method of manufacturing a smart card providing positioning of functional elements on at least one of the two plates of the smart card and joining the plates, wherein
   a display based on a liquid-crystal display element with an internal polarizer is used as one of the functional elements of the card,
   the display element being formed during card manufacturing, with at least one of the plates of the card used as one of walls of the display element, and
   a system of electrodes of the display element formed on the internal-surface side of the at least one plate of the card.

17. The method of claim 16, wherein the second plate of the card is used as the second wall of the display element, with the system of electrodes of the display element formed on the internal-surface side of the second plate of the card.

18. The method of claim 16 or 17 wherein, for the reflective display element, the system of electrodes of at least one of the walls is made of optically transparent material, on top of which a polarizer layer is formed, and a reflecting layer is formed on the surface of the other wall, with at least the part of the card plate which is the wall of the display element made of optically transparent material.

19. The method of claim 18, wherein the reflecting layer forms the system of electrodes of the said wall.

20. The method of claim 18 wherein the reflective display element contains a birefringent layer which is formed on the surface of the diffusely reflecting layer from one side, or on the surface of the polarizer layer from the other side.

21. The method of claim 20, wherein the system of electrodes and system of conductors can be made of the same material, or of different materials.

22. The method of claim 18 wherein at least one polarizer layer is formed on an optically transparent system of electrode, or on the wall of the display element, or on the insulating sublayer covering the optically transparent system of electrode.

23. The method of claim 16 wherein system of conductor is one from functional elements of smart-card and the procedure of its forming on at least one of the card plates is performed before or after formation of the system of electrodes of the display on that plate, or simultaneously, in a single work cycle.

24. The method of claim 16 wherein at least one intermediate plate is imposed on at least one of the card plates, the intermediate plate having windows to place the appropriate functional elements, and the functional elements are placed on the plate before imposing the intermediate plate, or after, in the appropriate windows, or partially before and partially after.

25. A smart card comprising two plates with the functional elements placed therebetween, said functional elements including a reflective liquid crystal display element, wherein the display element includes two spaced walls and liquid crystal placed therebetween, wherein each wall includes a system of electrodes formed on the surface of the wall, and one wall has at least one polarizer on its surface, and another wall has a reflective layer on its surface, wherein at least one of said walls of the display element is one of the plates of the card, and at least one polarizer is placed on the internal surface of the wall.

26. The smart-card as in claim 25 wherein the second plate of the card is used as the second wall of the display element.

27. The smart card as in claim 26 wherein a reflective element is used as the display element, the system of electrodes of at least one of the walls in the reflective element is made of optically transparent material, and a reflecting layer is placed on the surface of the other wall.

28. The smart card as in claim 27 wherein the reflecting layer forms the system of electrodes of the said other wall.

29. The smart card as in claim 27 wherein one of the walls of the reflective display element is made of optically transparent material, while the second wall, on which a reflecting layer is placed, is made of single-crystal silicon, or metal, or glass, or plastic.

30. The smart card as in claim 29 wherein a birefringent layer is placed between the reflecting layer and the liquid crystal in the reflective display element.

31. The smart card as in claim 29 wherein a birefringent layer is placed between the liquid crystal and the polarizer layer in the reflective display element.

32. The smart card as in claim 29 wherein system of electrodes on at least one of the walls of the display element is made of electrically conductive polymer.

* * * * *